United States Patent [19]

Ito et al.

[11] Patent Number: 4,921,329

[45] Date of Patent: May 1, 1990

[54] REAR PROJECTION SCREEN

[75] Inventors: Akira Ito, Atsugi; Mizuo Okada, Yokohama, both of Japan

[73] Assignee: Mitsubishi Rayon Co., Ltd., Tokyo, Japan

[21] Appl. No.: 221,531

[22] Filed: Jul. 19, 1988

[30] Foreign Application Priority Data

Jul. 21, 1987 [JP] Japan ................................ 62-180122

[51] Int. Cl.$^5$ ............................................ G03B 21/60
[52] U.S. Cl. .................................................... 350/128
[58] Field of Search ................................ 350/123, 128

[56] References Cited

U.S. PATENT DOCUMENTS

| | | | |
|---|---|---|---|
| 3,523,717 | 8/1970 | Glenn, Jr. ............................ | 350/123 |
| 3,830,556 | 8/1974 | Bratkowski .......................... | 350/128 |
| 4,432,010 | 2/1984 | Oguino et al. .................... | 350/128 X |
| 4,490,010 | 12/1984 | Honda et al. ....................... | 350/128 |
| 4,509,823 | 4/1985 | Moriguchi et al. ................. | 350/128 |
| 4,536,056 | 8/1985 | Oguino ................................ | 350/128 |

FOREIGN PATENT DOCUMENTS

| | | |
|---|---|---|
| 58-187918 | 11/1983 | Japan . |
| 58-192023 | 11/1983 | Japan . |
| 58-205140 | 11/1983 | Japan . |
| 62-254134 | 11/1987 | Japan . |
| 62-280729 | 12/1987 | Japan . |

Primary Examiner—Richard A. Wintercorn
Attorney, Agent, or Firm—Brumbaugh, Graves, Donohue & Raymond

[57] ABSTRACT

Provided is a rear projection screen of a certain configuration having an entrance surface receiving red, blue and green rays from projectors on a projecting side and formed therein entrance lenses and an exit surface allowing images synthesized or merged with the red, blue and green light rays to be observed on a viewing side and formed therein exit lenses corresponding respectively to the incident lenses, each of the entrance lenses are each of the exit lenses having optical axes and lens surfaces around the optical axes, respectively, with theoretical curvatures so that each entrance lens transmits red, blue and green light rays to the corresponding exit lens while the entrance lens converges the light rays into a certain converging area around the cross point between the lens surface of the corresponding exit lens and the optical axis if the configuration of the screen is theoretical, and each associated exit lens emits the converged light rays from the exit surface toward the viewing side over a predetermined viewing angle, wherein the curvature of each exit lens is made to be moderate more than the theoretical curvature of the exit lens, outside of the converging area around the cross point between the lens surface and the optical axis of the exit lens.

3 Claims, 27 Drawing Sheets

SHIFT ANGLE : θ°=8
THICKNESS : +20μ
LATERAL SHIFT : +40μ

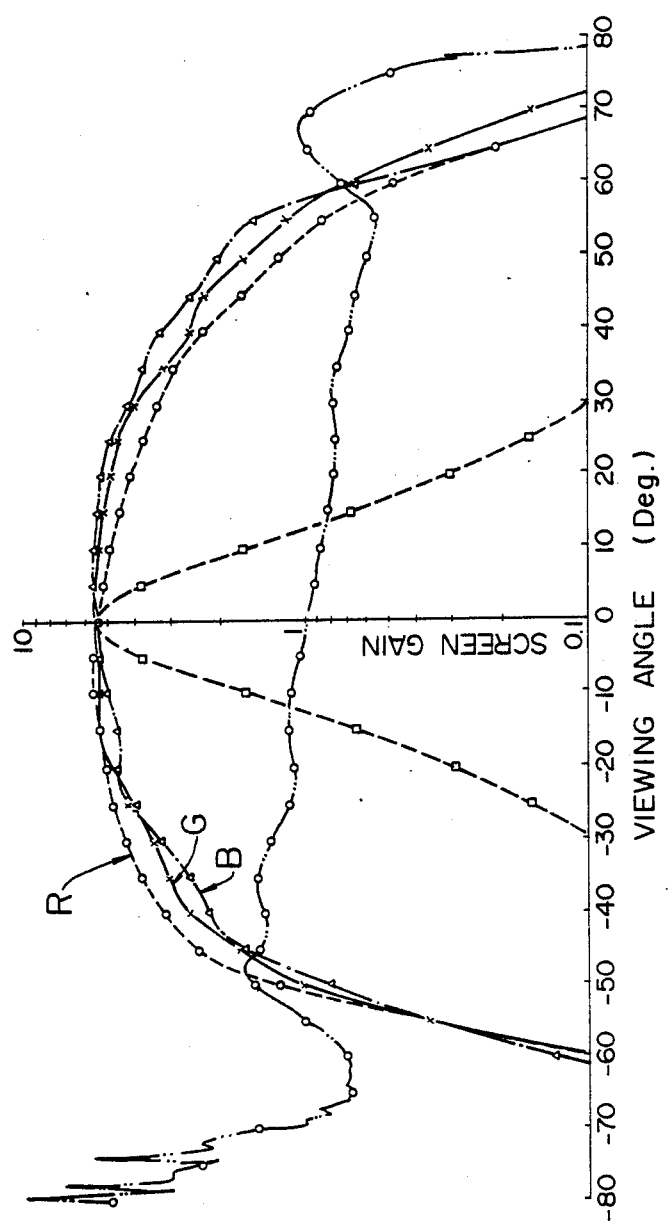

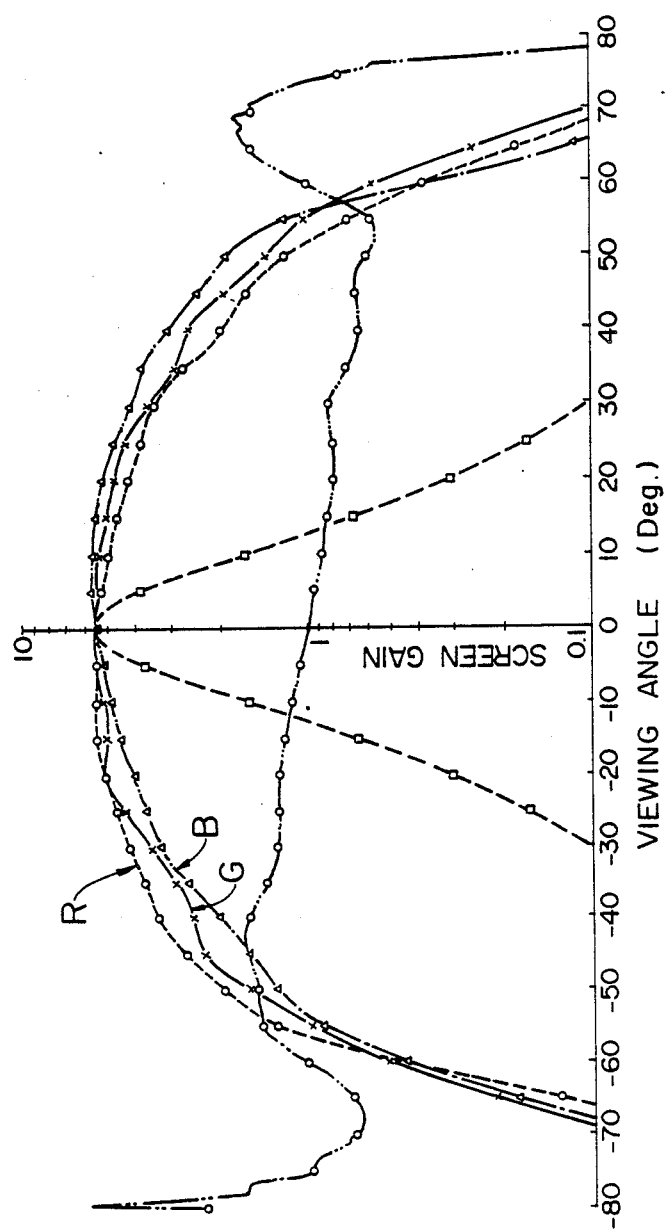

REAR PROJECTION SCREEN

The present invention relates to rear projection screens or light transmission screen which are suitably used for rear projection TVs, microfilm readers and the like.

Rear projection screens have been widely used in order to display filmed advertisements, projected TV images, screen in games and the like. Such kinds of rear projection screens usually have predetermined shape lenses on at least either of the entrance surface or exit surface thereof in order to increase the luminance of images as viewed on the viewing side and to enlarge its viewing angle range. Further, it has been well-known that, for example, lenticular lenses or fly-eye lenses formed on both sides of the screen are typically used as the above-mentioned lenses. Such screens are disclosed in, for example, Japanese Patent Laid-Open No. 58-559436, Japanese Utility Model Publication No. 52-4932, Japanese Utility Model publication No. 55-130366, Japanese Patent Laid-Open No. 57-81254, Japanese Patent Laid-Open No. 57-81255 and Japanese Patent Laid-Open No. 58-108523. These references disclose rear projection screens using convex lenticular lenses or fly-eye lenses having a cross-section which is a part of a circular, elliptic or parabolic shape, a shape determined by a high order expression, or the like.

Further, screens having flat or polygonal surfaces as the exit surface have been practically used. However, these screens are inferior in color balance to those using convex lenticular lenses or fly-eye lenses.

Further, in a so-called projection TV which is typically shown in FIG. 5 of the accompanying drawings, three cathode ray tubes (CRT) 100, 101, 102 of red, green and blue colors are laid on a horizontal line, for projecting images through lenses 103, 104, 105 onto a screen 106 on which these images are synthesized or merged, the red, green and blue light beams being projected at different angles to the screen. In such an arrangement, the red and blue light beams are incident upon the screen with relative angles about the green light beam as a center line. The difference in angle between these light beams is around 8 deg. in most cases at the center point of the screen. That is, as shown in FIG. 5, the angle $\theta_1$ between the green light beam and the red light beam and the angle $\theta_2$ between the green light beam and the blue light beam are about 8 deg. In this screen, the greater the off-center deviation from the center of the screen, the greater the difference between these angle $\theta_1$, $\theta_2$ becomes. Accordingly, color tones are liable to vary in dependence upon a position at which images are observed, or in dependence upon positions on the screen. That is, the hold of the color balance is very difficult. For example, when a white color image is projected on the screen in order to be examined, the image has colors which are different from the white in dependent upon the position from which the screen is observed. That is, a violet color is sometimes observed at a certain position on the screen, and further there is possibility of reddish colors and greenish colors which are visible from one part or an entire part of the screen.

Referring to FIG. 6, one example of rear projection screens which has been designed to eliminate the above-mentioned problem concerning color balance is shown in cross-section.

In this fig., reference numeral 1 denote elliptic entrance lenses formed on the entrance side of the rear projection screen; 50, a transparent medium; 2, exit lenses formed on the viewing side thereof; 3, trapezoidal ridges formed on the exit surface of the screen at positions where no light is focused; and 4, ambient light absorbing layers formed on the top parts of the trapezoidal ridges 3. The shapes of the elliptic entrance lenses 1 and the exit lenses 2, the refractive index of the medium 50 and the arrangement of both lenses and the like are suitably selected in accordance with a desired characteristic of a screen to be used. For example, the Japanese Patent Laid-Open No. 58-59436 discloses a rear projection screen thereof are each formed of a part of a convex surface extending in the direction of the major axis of the ellipsis having an eccentricity equal to the inverse value of the refractive index of the lens medium, and exit lenses are each formed at a position coincident with the focal point of the above-mentioned elliptic surface, remote from the entrance lenses, in the shape of an elliptic surface having an eccentricity substantially equal to the afore-mentioned eccentricity.

Referring to FIG. 7, the pattern of light rays is shown, being given by the above-mentioned rear projection screen that has a configuration in which the entrance lenses and the exit lenses are theoretically arranged. The pattern of the light rays is obtained when the blue, green and led light rays R, G, B are projected onto the screen. As clearly understood from FIG. 7, the substantial part of the blue, green and red light rays is converted around the center point between the point A, B above and below the optical axis l, and is then emitted from this light ray converging area toward the viewing side.

The above-mentioned rear projection screens which require precise shape control, configuration control and the like, should have been manufactured with a high degree of accuracy. However, it is generally difficult to strictly maintain the shape and configuration of screens since the radius of curvature of the entrance and exit lenses are generally 0.3 and 0.6 mm, respectively, such as those having a shape and a configuration as shown in FIG. 6.

There are many errors in manufacture of the screens, such as errors in the thickness of the screen between the entrance and exit lenses causing aberrations in the characteristics of images, a shift between the axes of the entrance and exit lenses, and the like. Such errors in manufacture cause the following disadvantage:

FIG. 8 shows a pattern of light rays in which the focal length of the entrance lens 1 is in excess of by +10% due to an error. In such a case, a part of light rays from the entrance side has a greater incident angle to the exit lens than the critical angle which is outside of the light ray converging area between the points A and B in FIG. 7, and therefore, the light rays having the incident angles exceeding the critical angle do not emanate from the exit lens but are totally reflected toward entrance side. Such light rays give stray light causing not only the luminance but also color balance, sharpness and the like of an image to be lowered.

Further, the above-mentioned phenomenon is caused not only due to inaccuracy in the shapes of the entrance and exit lenses but also due to a longer and shorter distance between both lenses than a designed distance therebetween. Further, it is also caused due to a shift between the optical axes of both lenses.

FIG. 9 shows the pattern of light rays in which the axes of both lenses are shifted from each other by 10% of their pitches P. In such a case, total reflection due to the light rays exceeding the critical angle occurs in the area opposite to the direction in which the axes are shifted. Further, the problem of the total reflection due to the errors also occurs similarly even in a screen in which the cross-sectional shape of the exit lens is not elliptic but is given by a parabola or a higher order expression.

No effective measures have yet been practically taken to cope with deterioration in the characteristic of the screen due to the above-mentioned errors in manufacture of conventional rear projection screens. That is, in a conventional screen as mentioned above, should a slight shift be present between both front and rear surface lenses, the above-mentioned problem of total reflection occurs causing color tones, image quality and the like to be abnormal, and therefore, no satisfactory rear projection screens have yet been practically produced.

For example, in the configuration of the rear projection screen as shown in FIG. 6, even errors about 30 μm in the widthwise direction and about 120 μm in the thicknesswise direction causes practical problems if the screen has entrance lenses having pitches P which are set as P=1 mm. Accordingly a molding facility with a high degree of accuracy has been required for manufacturing the screens, and even with such a facility, the percentages of defective products has been high such that the yield thereof has not been satisfactory.

SUMMARY OF THE INVENTION

One main purpose of the present invention is to provide a rear projection screen of a both surface lenticular lens type in which no optical detrimental effects are present even though a slight shift occurs in the positional relationship between both front and rear surfaces of the screen.

To this end, according to the present invention, there is provided a rear projection screen of a certain configuration having an entrance surface receiving red, blue and green rays from projectors on a projection side and formed therein entrance lenses and an exit surface allowing images synthesized or merged with the red, blue and green light rays to be observed on a viewing side and formed therein exit lenses corresponding respectively to the entrance lenses, each of the entrance lenses and each of the exit lenses having optical axes and lens surfaces around the optical axes, respectively, with theoretical curvatures so that each entrance lens transmits red, blue and green light rays to the corresponding exit lens while the entrance lens converges the light rays into a certain converging area in the vicinity of the cross point between the lens surfaces of the corresponding exit lens and the optical axis if the configuration of the screen is theoretical, and each associated exit lens emits the converged light rays from the exit surface toward the viewing side over a predetermined viewing angle, wherein the curvature of each exit lens is made to be moderate more than the theoretical curvature of the exit lens, outside of the converging area around the cross point between the lens surface and the optical axis of the exit lens.

BRIEF DESCRIPTION OF THE INVENTION

These and various other objects, features and advantages of the invention will be detailed in the following description with reference to the drawings in which:

FIG. 25 through 28 are views illustrating the results of experiments using the rear projection screens having configuration shown in FIGS. 11 and 12.

DESCRIPTION OF PREFERRED EMBODIMENTS

First, explanation will be made hereinbelow to findings which were obtained after studing the above-mentioned problem of total reflection.

Figure 8:
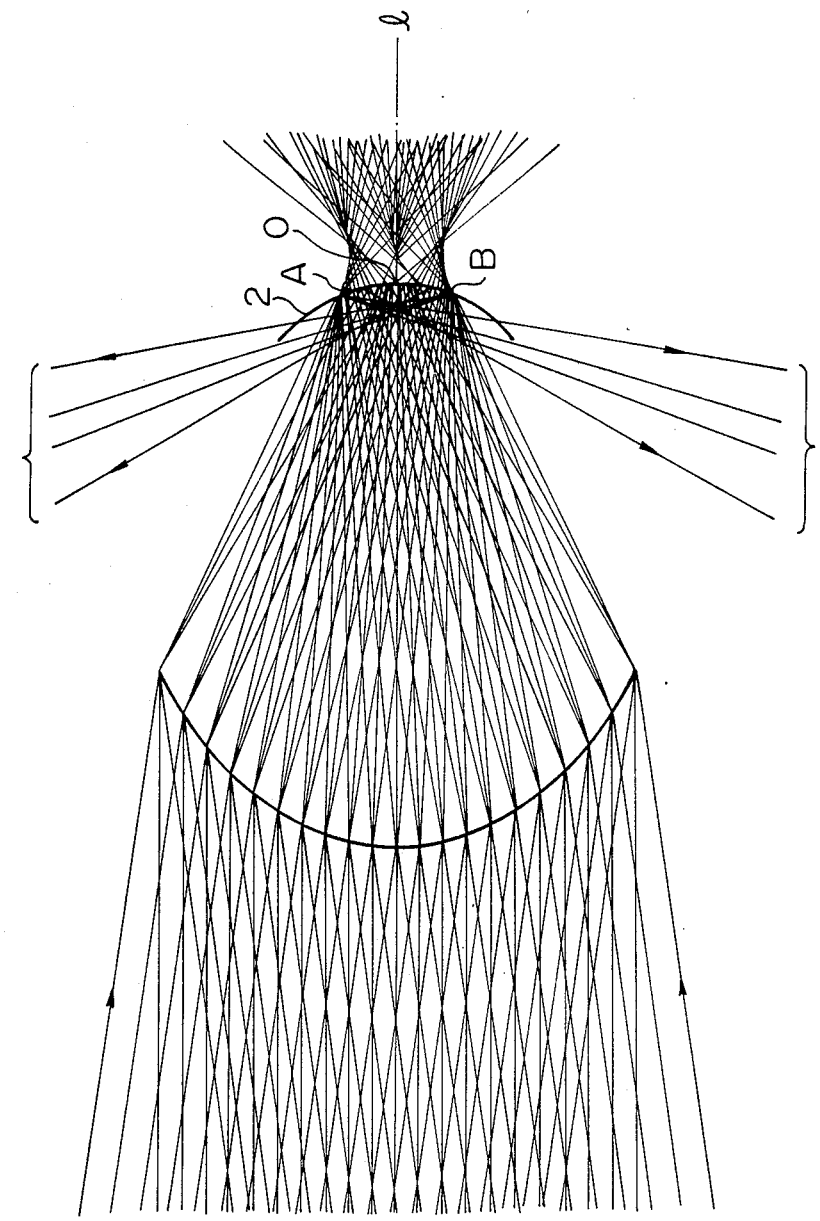
FIGS. 8 and 9 are cross-sectional views illustrating patterns of light rays in the case that positional shifts are encountered in the screens in the lens system as shown in FIG. 6.
Figure 9:
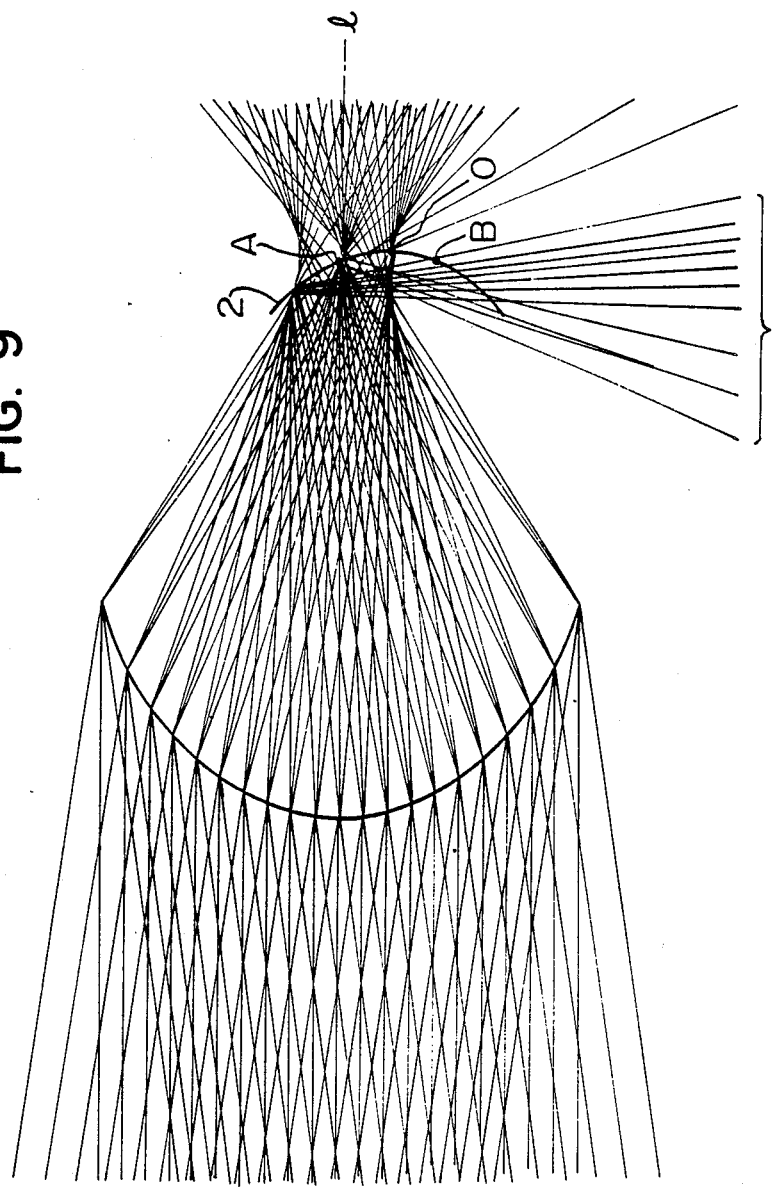
Figure 10:
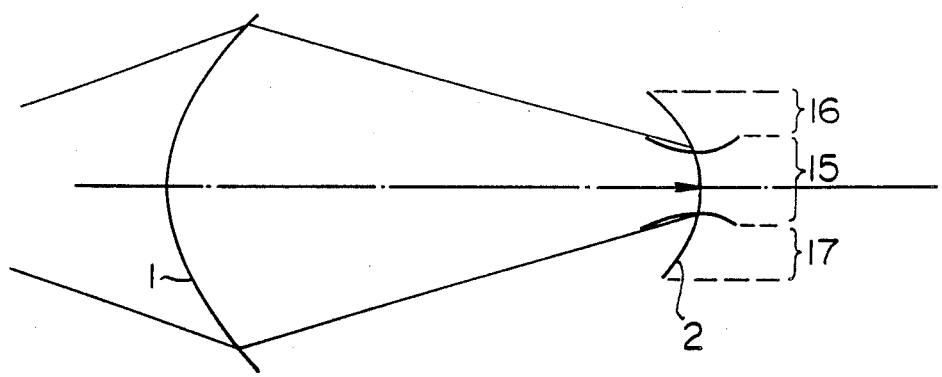
FIG. 10 is a cross-sectional view illustrating a light pattern of light rays passing through a rear projection screen of a theoretical configuration.

Referring to FIG. 10 in which a rear projection screen of an theoretical configuration is shown, light rays emanating from an exit lens 2 are converged in the focusing area 15 of the exit lens 2, and a highly accurate shape of the exit lens 2 is required in that area in order to maintain suitable color balance. Further, in a rear projection TV in which red, blue and green light beams are projected to the rear projection screen at different angles, the above-mentioned focusing area 15 is inevitably widened. The light rays which impinge upon the exit lens 2 outside of the focusing area 15 due to errors in manufacture cause the problem of total reflection since these light rays are incident upon the exit lens at incident angles exceeding the critical angle of the exit lens around the focusing area 15 (those light rays correspond to the red and blue light rays which are incident upon the exit lens from the outside part of the exit lens 1 in the case of FIGS. 8 and 9). Accordingly, in order to eliminate the problem of total reflection, the cross-sectioned shape of the exit lens is so selected that it prevents the total reflection of the red and blue light rays in the parts 16, 17 outside of the focusing area 15. This can be attained by making the inclination of the emanating lens 2 moderate over those parts. In other words, the inclination of the lens over that parts is so selected that the incident angles of the light rays which could possibly cause the problem of total reflection are decreased.

The inventors have proposed two methods of providing the inclination of the exit lens in those parts outside of the light ray converging area.

In one of the methods, the cross-sectional shape of the exit lens is formed, in the center section thereof which corresponds to the focusing area 15, of a part of a predetermined curve, and both side sections 16, 17 outside of the center section are formed of straight lines which are tangential to the above-mentioned curve, having a gentle inclination.

In the other of the methods, a part which gives a horizontal line in cross-section having a length of about 1 to 10% of the pitches of the entrance lenses is formed in the center part 15 of the exit lens, and both side parts outside of the center part are formed of a part of a curve which is circular, elliptic or parabola, or a high-order expression. That is, the halves of a part of a curve which should be inherently positioned in the center section of the lens are shifted in parallel toward both sides thereof so that the inclination of the areas 16, 17 upon which the light rays are liable to totally reflect are made to be gentle.

With a rear projection screen produced in the above-mentioned first method, even though the incident positions of the light rays are varied due to errors in manufacture, there is no problem of total reflection causing light rays to reflect back toward the entrance side of the screen since the inclination of the straight line parts of the exit lines is more gentle than that the corresponding parts of an exit lens which is obtained when the positional relationship between the entrance lens and the exit lens is theoretical.

Further, with a rear projection screen produced in the above-mentioned second method, a flat part is formed in the center section of the exit lens and convex curved surface parts are slightly shifted in the lateral direction, and therefore, there is no problem of total reflection causing the light rays to reflect back into the incident side of the screen since the inclination of the shifted curved parts is more gentle than that of the original configuration even though the lenses on both sides of the screen are laterally shifted from each other, even though the thickness of the screen is different from a designed value.

Detailed explanation will be made of the preferred embodiments of the present invention.

Figure 1:
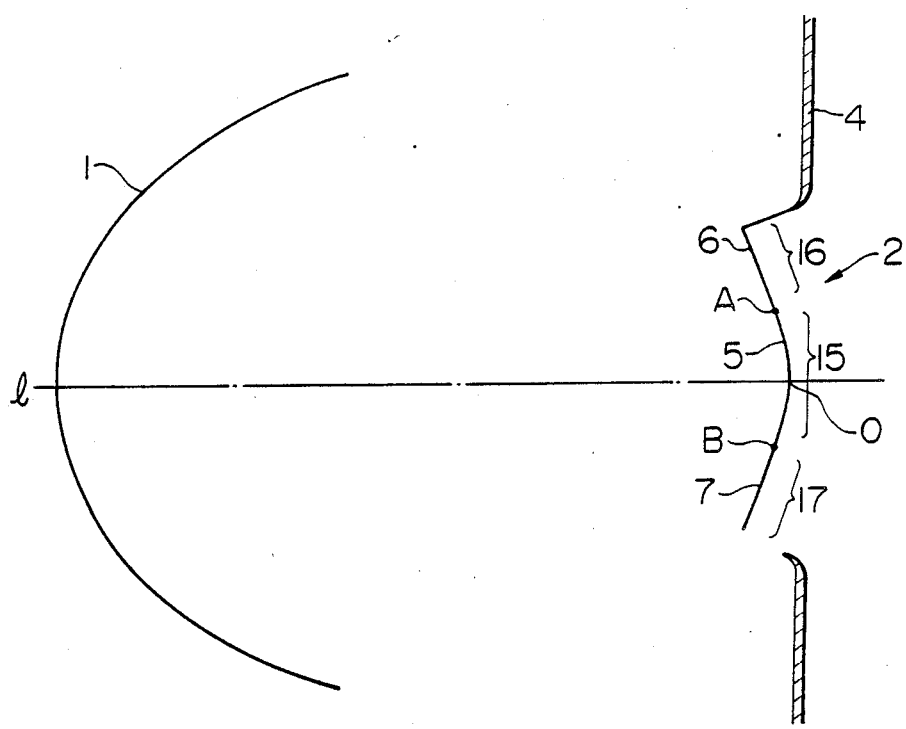
FIG. 1 is a cross-sectional view illustrating the arrangement of rear projection screen in accordance with the present invention.

FIG. 1 schematically shows a first embodiment of a rear projection screen in accordance with the present invention.

Referring to FIG. 1, reference numeral 2 denotes an entrance lens; 3 is an exit lens; 5, a curved part arranged in the light ray focusing area, extending on both sides of the optical axis (1); and 6, 7, straight line parts arranged in the areas 16, 17 which are liable to cause the problem of total reflection. The curved part 5 are continuous with the straight line parts 6, 7 through joint points A, B which are set at predetermined positions on both sides of the above-mentioned light ray focusing area 15 in the vicinity of the latter.

With the first embodiment constructed as mentioned above, the light rays adapted to pass through the areas 16, 17 outside of the light ray focusing area 15 may be incident upon the straight line parts 6, 7 of the exit lens even through the front and rear lenses are laterally shifted and/or the thickness of the screen differs from a designed value. That is, the inclination of the outer extremity of the peripheral section of the light passing part which is obtained when the positional relationship between the front and rear lenses of the screen is theoretical, is also maintained by the straight line parts 6, 7, and is therefore relatively gentle. Thus, it is possible to prevent the problem of total reflection causing the light rays to reflect back to the entrance side.

Explanation will be detailed how to determine the inclination of the straight line parts 6, 7 and the joint points A, B between the parts 6, 7 and the curved part 5.

Figure 2:
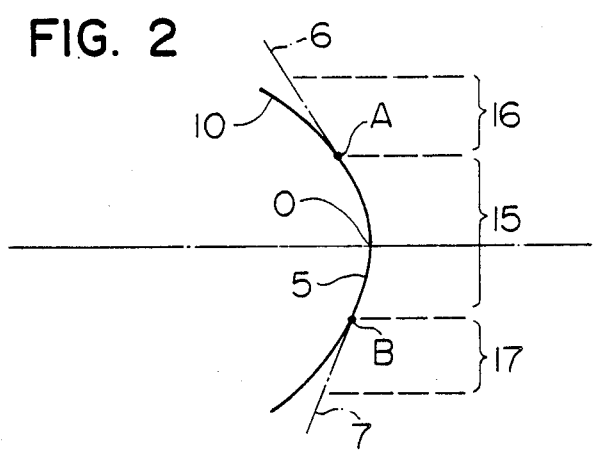
FIG. 2 is a cross-sectional view illustrating a first embodiment of the present invention.

Referring to FIG. 2 which shows the cross-sectional shape of the exit lens 2 in an enlarged view, reference numeral 10 denotes a curve of a high order expression a part of which gives the cross-sectional shape of the curved part 5 of the lens 2 as shown in FIG. 1. In FIG. 2, reference numeral 15 is a light ray focusing area; 16, 17, areas in which the light rays are liable to totally reflect when the manufacturing accuracy of the screen is unsatisfactory; A, B, joint points between the above-mentioned curved part 5 and the straight line parts 6, 7 and are located in the vicinity of the focusing area 15. As clearly shown in FIG. 2, the lines tangential to the curve 10 at the points A, B define the straight line parts 6, 7 shown in FIG. 1. Accordingly, the straight line parts 6, 7 prevent total reflection of light rays passing through the areas 16, 17 where the light rays are liable to totally reflect since those parts 6, 7 have an inclination which is more gentle than that of the original curve 10 at that areas.

Figure 3:
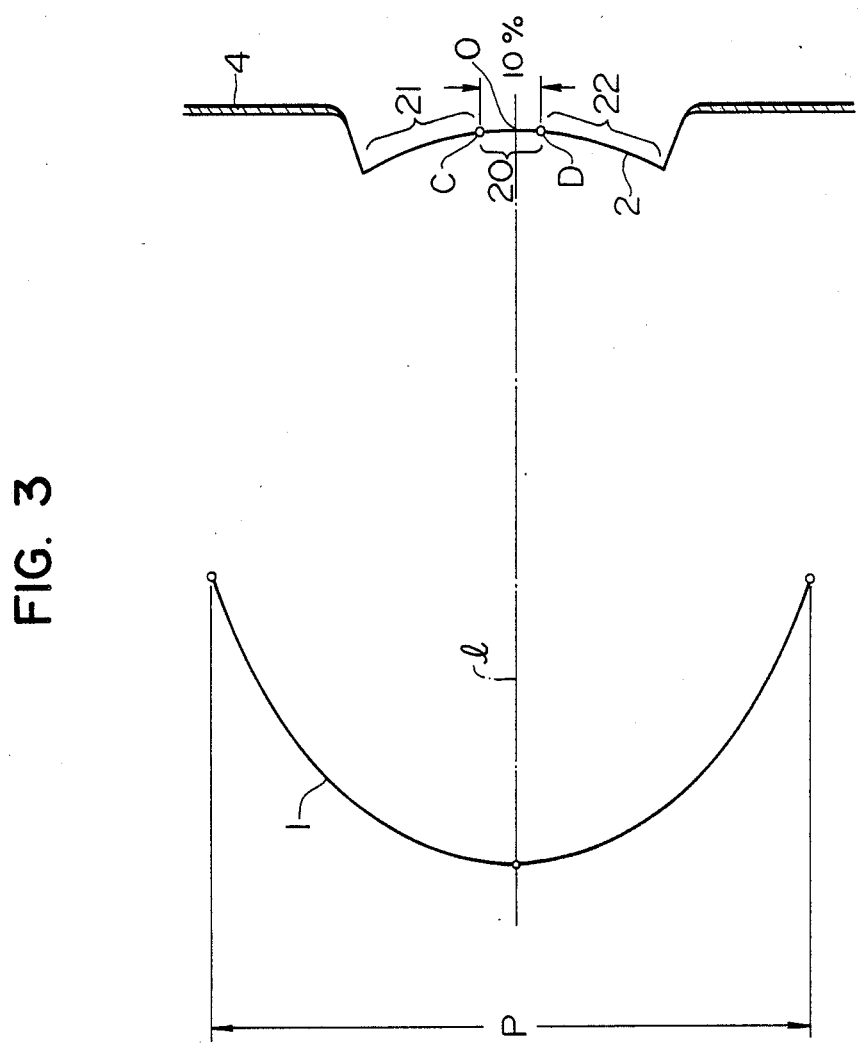
FIG. 3 is a cross-sectional view illustrating a second embodiment of the present invention.

FIG. 3 shows a second embodiment of the present invention.

Further, referring to the same figure, reference numeral 10 denotes a part formed in the center part of the exit lens 2 and having a horizontal line in cross-section, which will be referred to hereinbelow simply as "horizontal part". This horizontal part 20 has a width of about 1 to 10% of the pitches P of the incident lenses 1. Further, reference numeral 21, 22 denote curved parts formed on both sides of the horizontal part 20. These curved parts 21, 22 corresponds to the halves of the center part of the exit lens 2 on both sides of the optical axis 1 if the exit lens 2 has no horizontal part 20, and are jointed to the horizontal parts at the points C, D.

Figure 7:
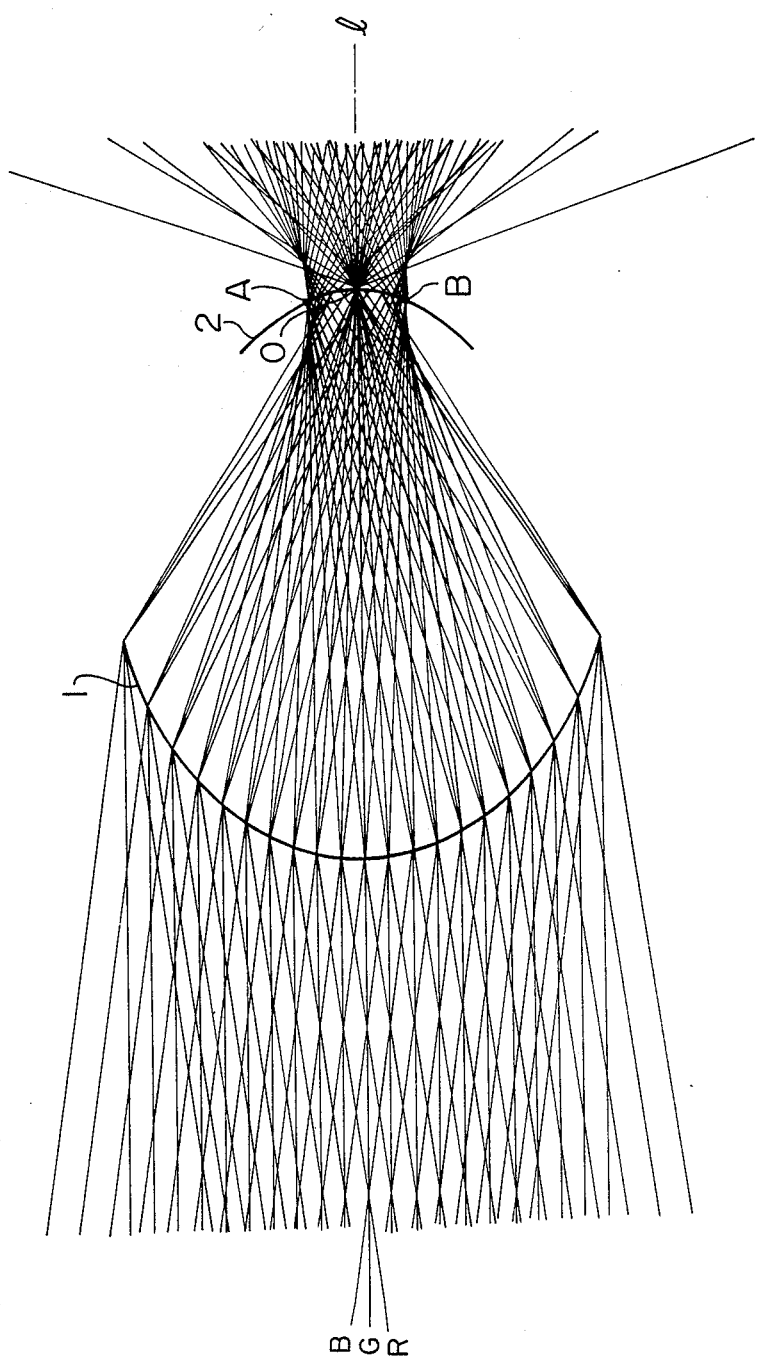
FIG. 7 is a cross-sectional view illustrating a pattern of light rays passing through a theoretical lens system in the conventional rear projection screen as shown in FIG. 6.

The reason why the length of the horizontal part 20, that is, the length of the line segment CD is set to about 1 to 10% of the pitches P of the entrance lenses, is as follows: As clearly shown in FIG. 7, when red (R), green (G) and blue (B) light rays are incident upon the convex curved entrance surface having an elliptic cross-sectioned shape at a concentrating angle of 8 deg., the width of the light ray focusing area AB at the exit surface is about 20% of the pitches P of the entrance lenses. Unless the length of the horizontal part 20 is limited to a half of the width of the focusing area AB at its maximum, no more than color balance resembling that obtained through a flat exit surface can be obtained, and therefore, it is set to about 10% of the pitches P at the maximum.

In more detail, the reason why the color balance is unsatisfactory is such that the emanating light rays of three colors R, G, B have individual light quantity distributions whose principal axes extend in different directions having angular differences nearly equal to the concentrating angle of 8 deg. around the green light ray G if the exit surface is flat or horizontal line-like in cross-section, in its entirety.

On the contrary, if the exit surface is not flat but of a convex cylindrical shape, the green light rays G are incident upon the exit surface at a right angle thereto after they are converged by the entrance surface, and have the light quantity distribution whose principal axis extends also at a right angle to the exit surface. Meanwhile, the red and blue right rays R, B are incident upon the inclined parts of the exit surface after they are converged by the entrance surface. Therefore, the red and blue light rays R, B are refracted under prism action toward the thick part of the lens when the inclined part is set at a suitable angle. Thus, their exit light rays can have light quantity distributions (orienting characteristic) whose principal axes extend in the same direction as that of the green emanating light rays G, and therefore, the color balance becomes satisfactory, only in such a case that the inclination of the inclined part is set at a suitable angle. Japanese Patent Laid-Open No. 58-59436 and Japanese Patent Laid-Open No. 58-134627 disclose rear projection screens having the above-mentioned arrangement.

The screens proposed by the above-mentioned Japanese Patent Laid-Open Publications, have exit surfaces each having an elliptic cross-sectioned shape whose one focal point is set to be entrance with the top point of the associated entrance lenticular lens of the middle point of the bottom of the trough between the adjacent entrance lenticular lenses. When the positional relationship between the entrance and exit surfaces precisely satisfies a designed condition, the above-mentioned satisfactory color balance can be obtained.

However, if the positions of the entrance and exit surfaces are laterally shifted from each other, if the thickness of the screen is insufficient or excessive, or if the radii of curvature of the entrance and exit surfaces are inaccurate, light rays are totally reflected so as to produce stray light or travel in unexpected directions, that is, the light rays can not emanate appropriately, and therefore, the light quantity distribution, the color balance, the sharpness of images and the like become worse.

Accordingly, in the second embodiment of the present invention, the part between the above-mentioned points C, D is made to be flat (horizontal line-like), and the cylindrical exit surface having an inherent theoretical shape are divided into halves which are shifted toward both sides so as to be spaced therebetween by the length of the line segment CD. Therefore, a new exit surface having a generally gentle inclination angle is formed.

The minimum length of the line segment CD should be determined in view of molding technology in consideration of the control of positional shifts of the entrance and exit surfaces, and the relaxation of limitation by positional accuracy. From this point, the length of 1% of the pitches P of the entrance lenses, that is, more than 10 μm is required for the length of the line segment CD to give a substantialy meaningful effect if the pitches P are 1 mm. Thus, the value of 1% of the pitches P is selected as the lower limit of the length of the line segment CD.

That is, as a result, in this embodiment, the halves of the curved part of the exit surface having a theoretical shape are shifted laterally and are spaced therebetween, corresponding to the horizontal part 20. With this arrangement, a gentle curve is arranged to the area where light rays are liable to totally reflect, and therefore, there is no problem of total reflection causing light rays to reflect back toward the incident side even though the thickness of the screen differs from a designed value and so forth. Further, the curved part 21, 22 are obtained by calculation with which their best optical characteristics are given, and therefore, the emanating characteristics of the emanating light rays can be near to those to be expected even though the curved parts 21, 22 are shifted in parallel. Thus, the deterioration of the characteristic of the screen due to such a parallel shift can be practically neglected when it is compared with the deterioration of the screen characteristic due to total reflection.

On the contrary, in the conventional rear projection screens, some of light rays pass through the exit surface having a theoretical configuration in parts, on both sides thereof, which have a very steep inclination, and therefore totally reflect upon such parts back toward the entrance surface, resulting in unbalance in the brightness of images, color tones and like.

Figure 4:
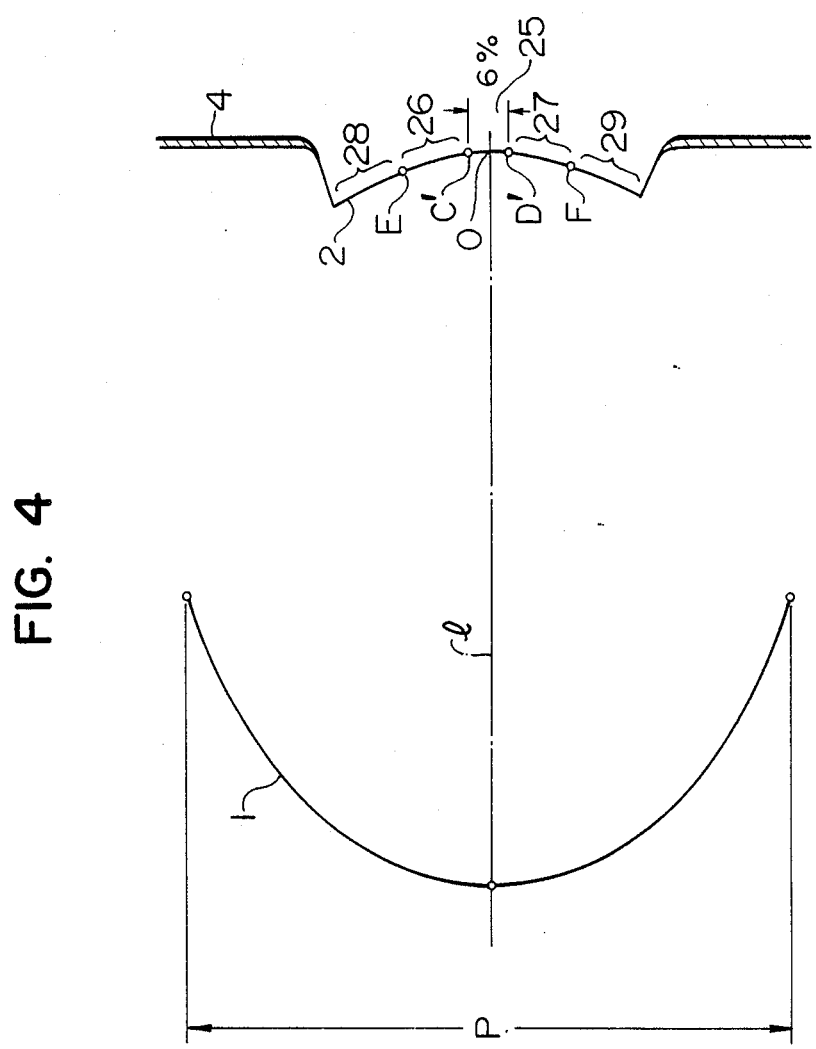
FIG. 4 is a cross-sectional view illustrating a third embodiment of the present invention.
Figure 5:
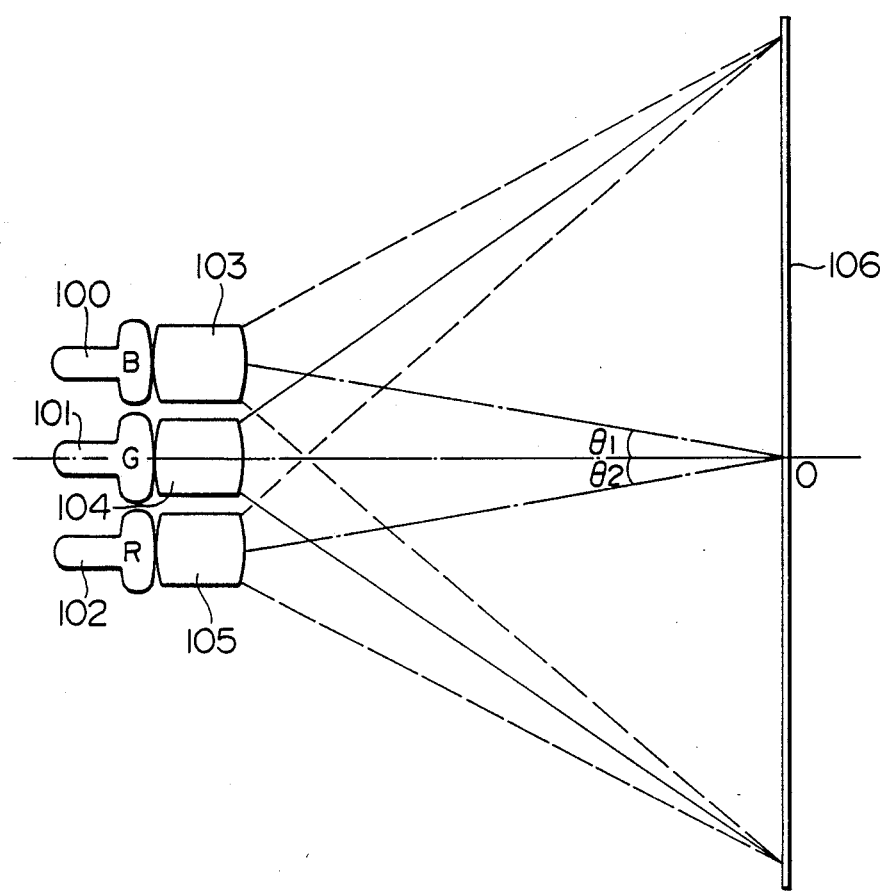
FIG. 5 is a plan view illustrating a rear projection system including projectors and a rear projection screen.
Figure 6:
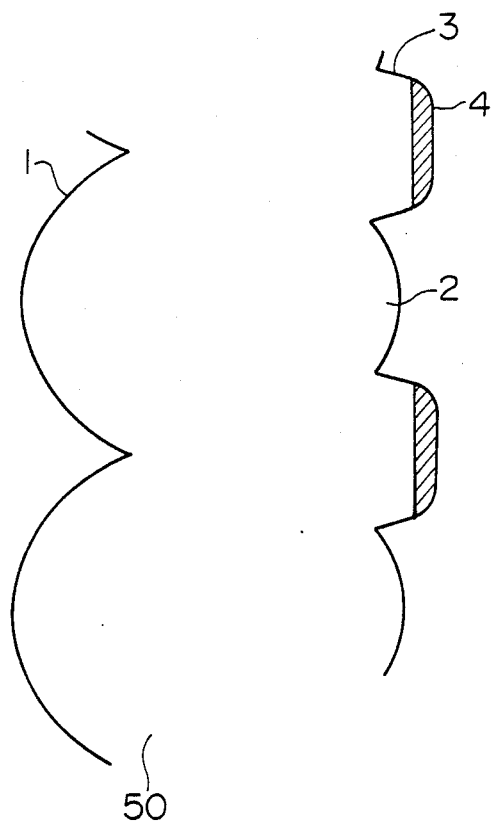
FIG. 6 is a cross-sectional view illustrating the arrangement of a conventional rear projection screen.

FIG. 4 shows a third embodiment of the present invention in which both arrangements of the first and second embodiments are combined.

Referring to FIG. 4, a horizontal part 25 having a length less than 6% of the pitches P is arranged between curved parts 26, 27, and straight line parts 28, 29 are further arranged on both sides thereof outside of the curved parts 28, 29. In this figure, reference numerals C', D' denote the joint points between the horizontal part 25 and the curved parts 26, 27, and E', F' denote the joint points between the curved parts 26, 27 and the straight line parts 28, 29.

The length of the line segment C'D is set to be about 1 to 10% of the pitches P while the distance between the points E', F' is about 20% of the pitches P and the outside straight line parts 28, 29 preferably has a length of about 1 to 10% of the pitches P, which give a width enough to absorb a positional shift between the entrance and exit surfaces or inaccuracy in the curvature of the lens surface.

Although the present invention has been explained in the preferred embodiment forms, it will be apparent to those skilled in the art that many changes and modifications may be made without departing from the concept of the present invention which is defined by the appended claims. For example, the entrance and exit lenses which are elliptic in the above-mentioned embodiments, can be formed of lenticular lenses of fly-eye lenses having a cross-sectioned shape which is elliptic, parabola or of a part of a high order expression.

With the above-mentioned arrangement of the present invention, the rear projection screen enhances the tolerance to the positional shift between the entrance and exit lenses. The degree of the tolerance, although depending upon the configuration of lenticular lenses, possibly attains several times as high as that of the conventional one without deteriorating color balance.

REFERENCE EXAMPLE

Figure 11:
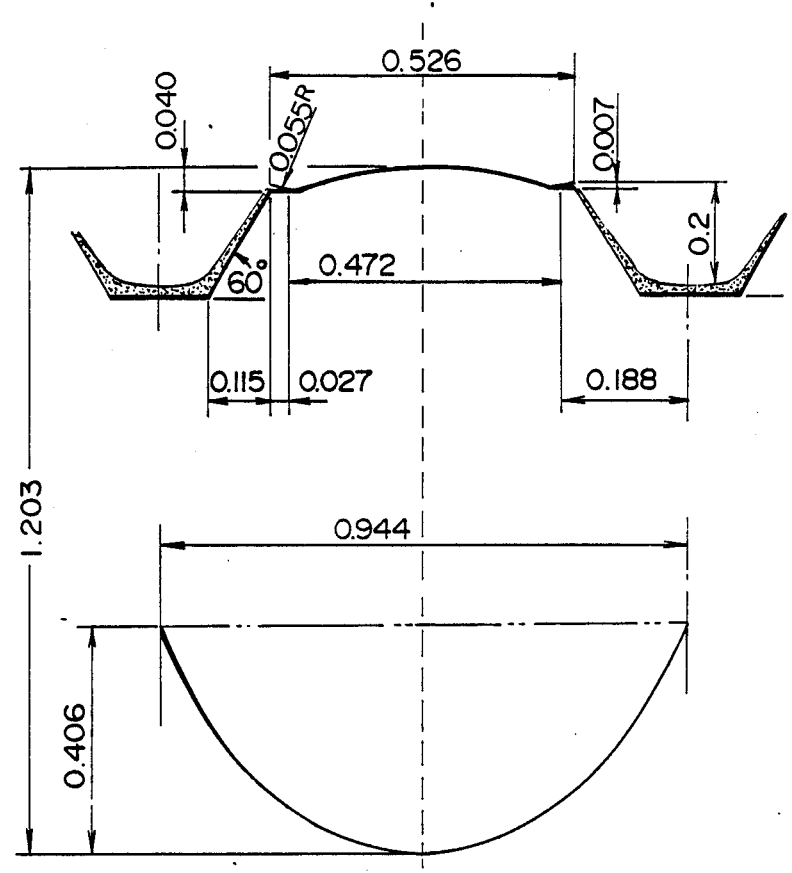
FIGS. 11 and 12 are cross-sectional views illustrating specific configurations of rear projection screens used for showing the technical effects and advantages of the present invention, FIG. 11 concerning the present invention and FIG. 12 concerning prior art.

In order to evaluate the effect of the present invention, a rear projection screen having a configuration shown in FIG. 11 was designed. This configuration will be explained below:

The surface of the entrance lens is a part of an ellipsis given by the general elliptic formula:

$$\frac{x^2}{b^2} + \frac{y^2}{a^2} = 1$$

The exit lens corresponds to the second embodiment of the present invention shown FIG. 3. That is, the width of the present invention shown FIG. 3. That is, the width of the horizontal part 20 is 9.90% of the pitches P of the entrance lens, and the width of the curved parts 21, 22 is 1.63% of the pitches P. Further, the theoretical curve of the emanating lens (refer to FIG. 7) is determined by the following polynomial expression:

$$y = c_0 + c_1 x^2 + c_2 x^4 + c_3 x^6 + c_4 x^8 + c_5 x^{10}$$

The thus obtained lens surface as shown in FIG. 3 is made to be approximate to a polynomial expression of the same order as that mentioned above.

COMPARISON EXAMPLE

Figure 12:
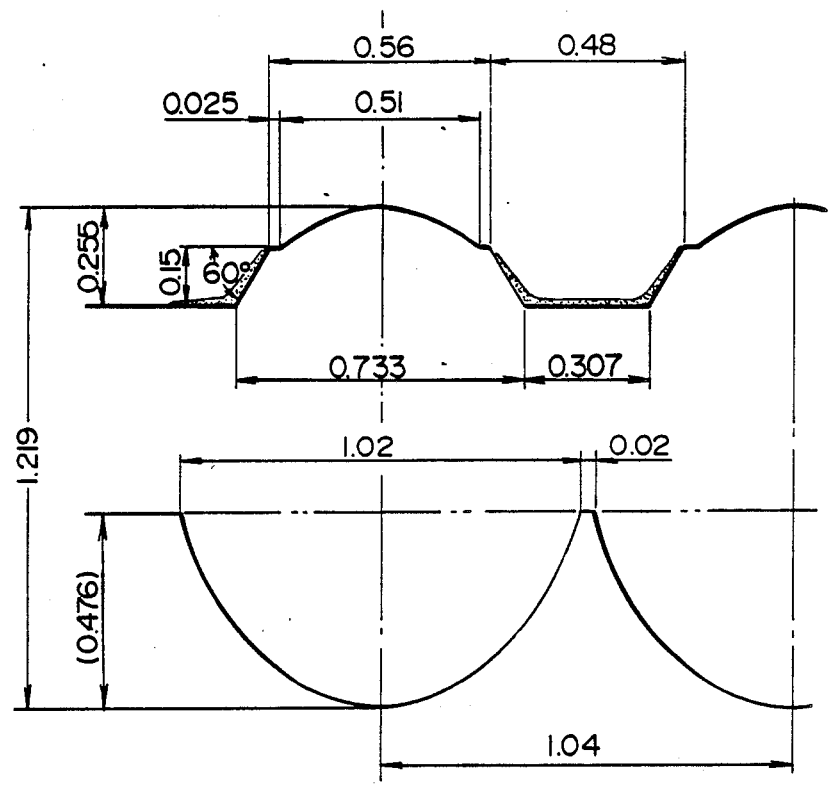
Figure 13:
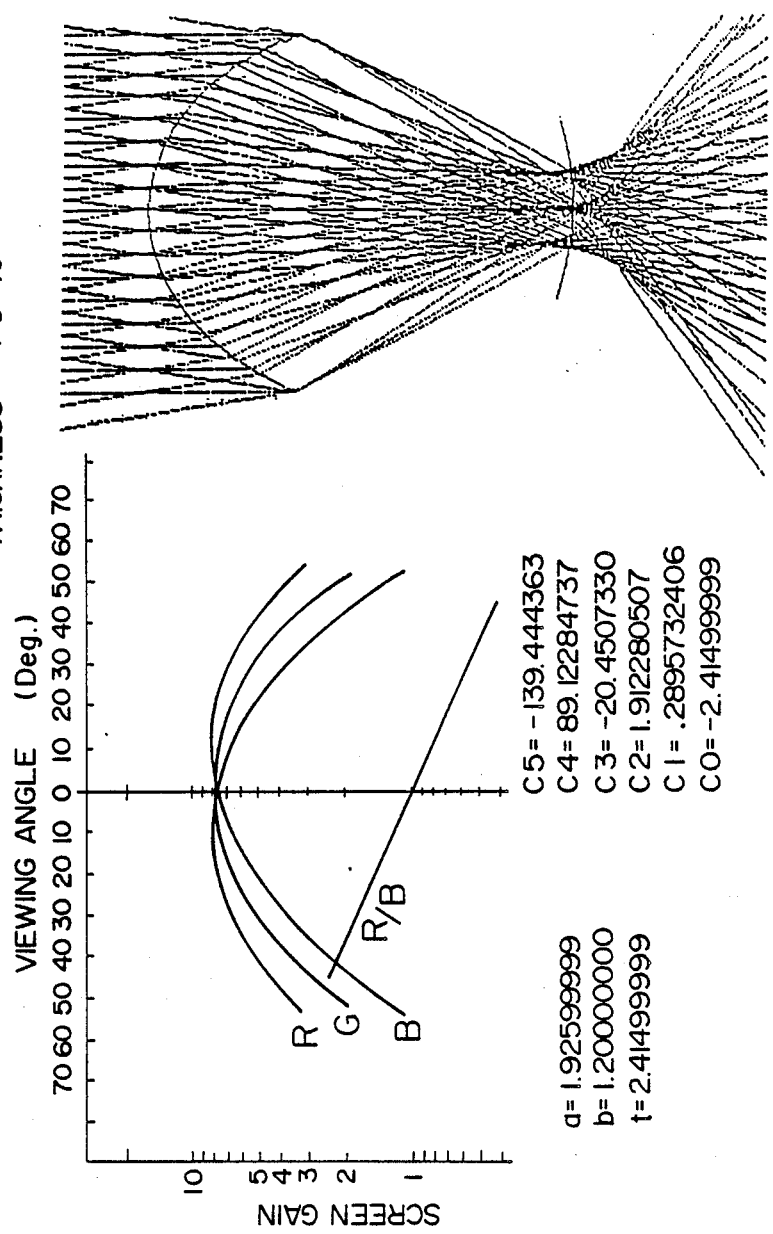
FIGS. 13 through 18 are views illustrating the results of calculation using the specific configuration of the screen according to the present invention.
Figure 14:
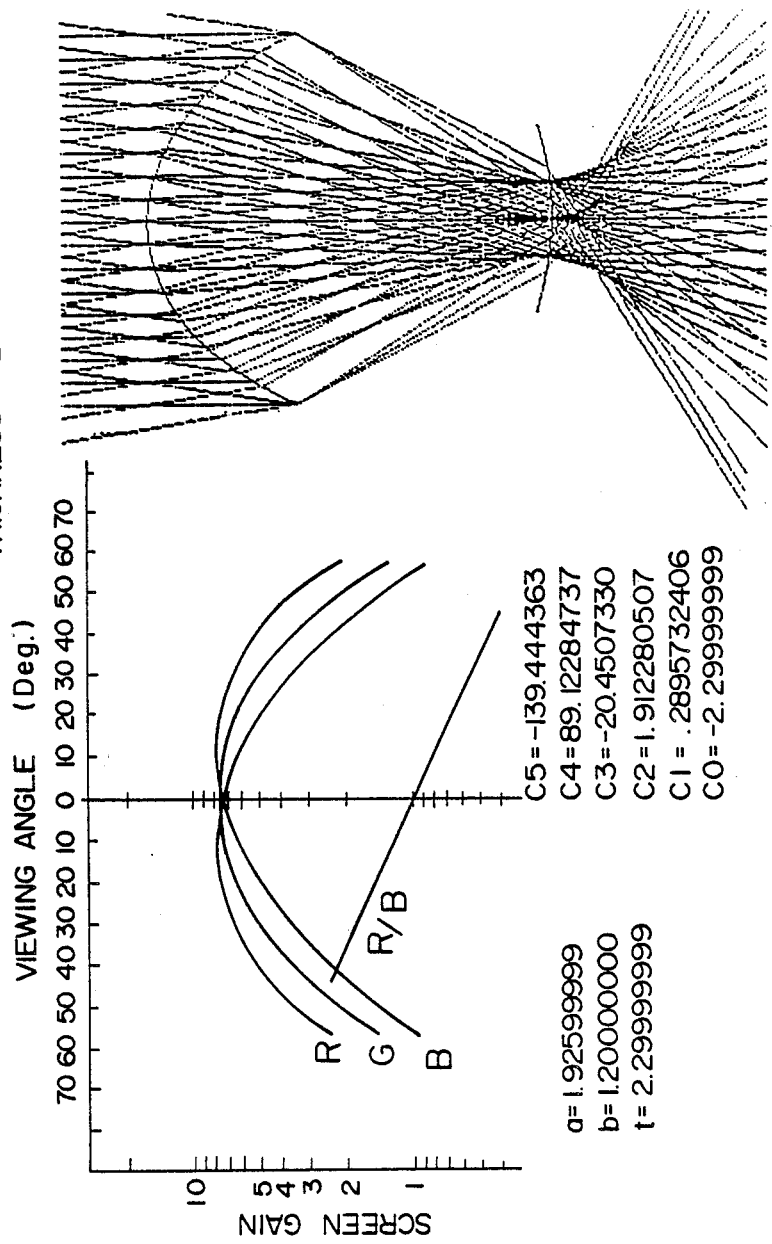
Figure 15:
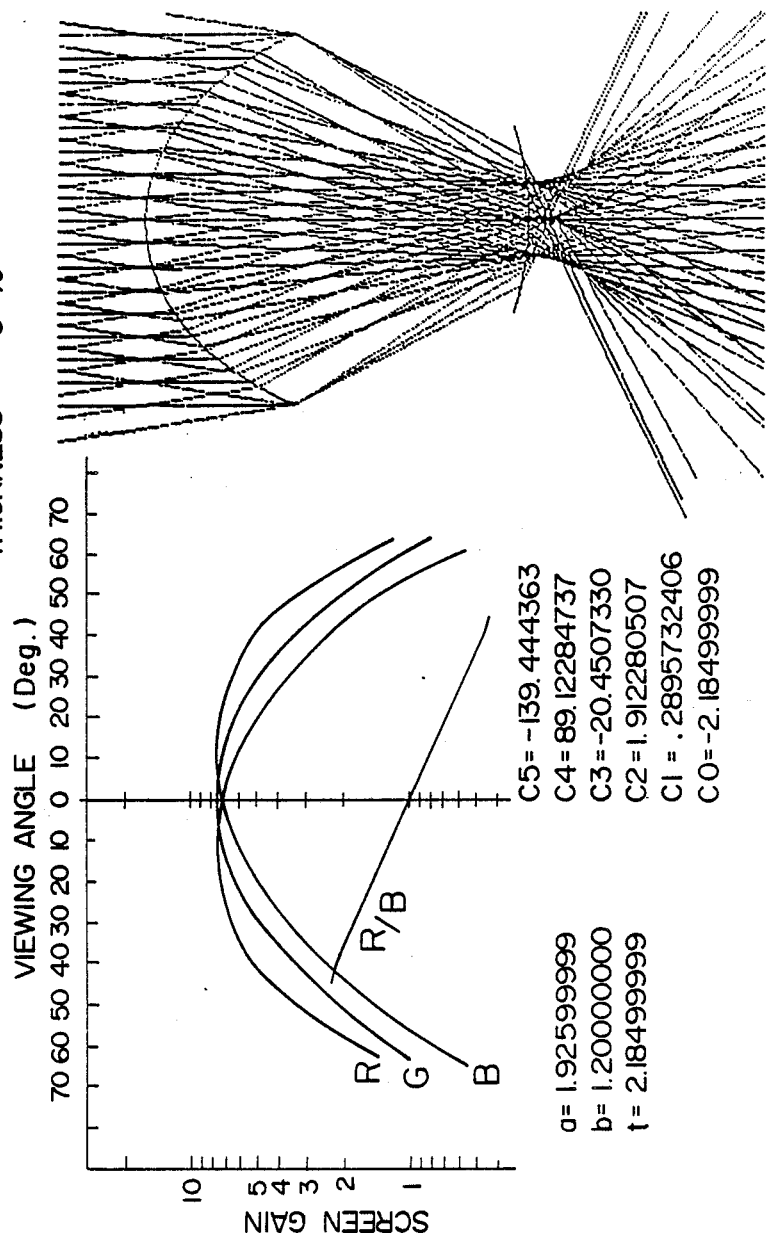
Figure 16:
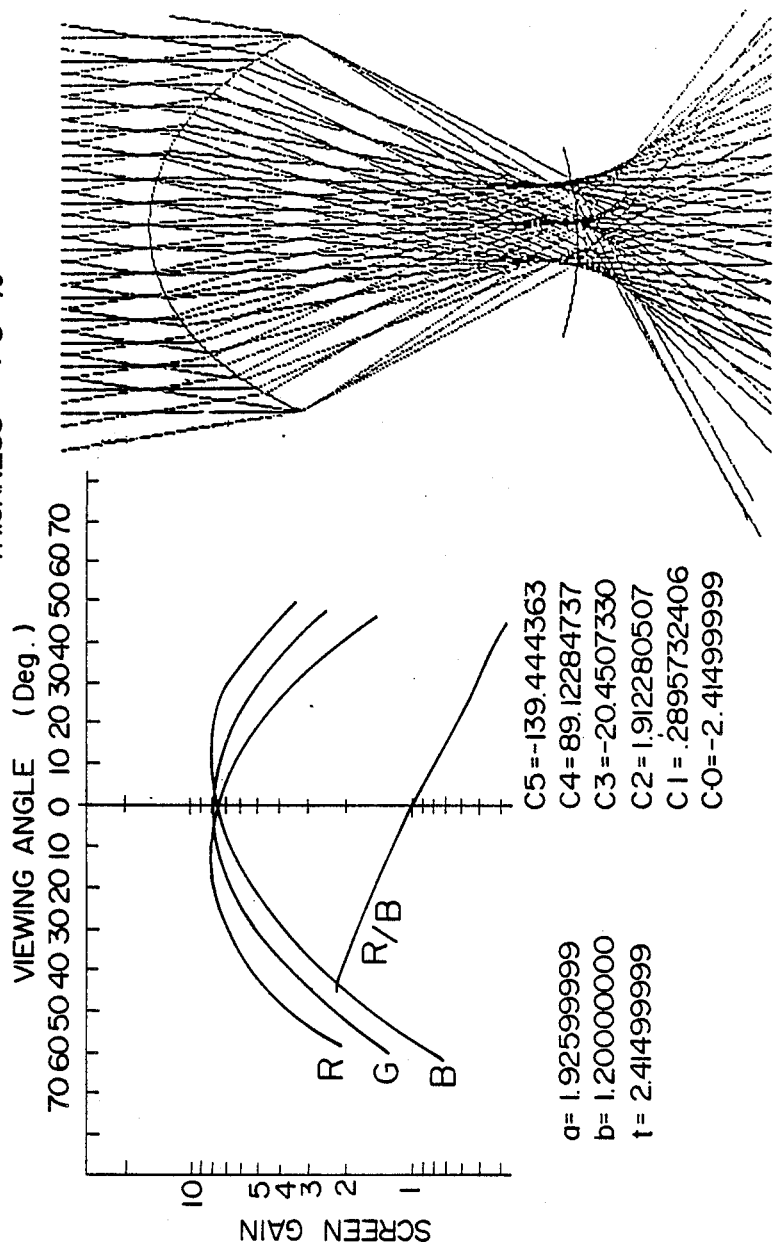
Figure 17:
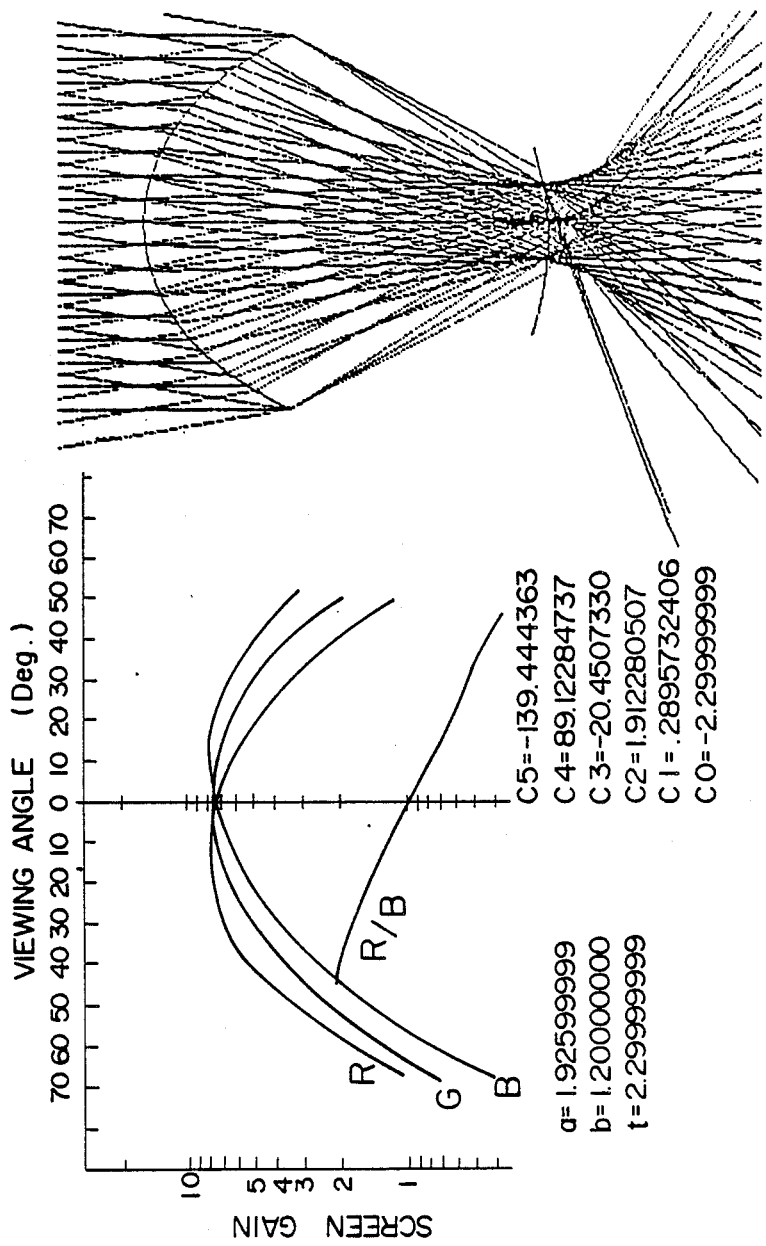
Figure 18:
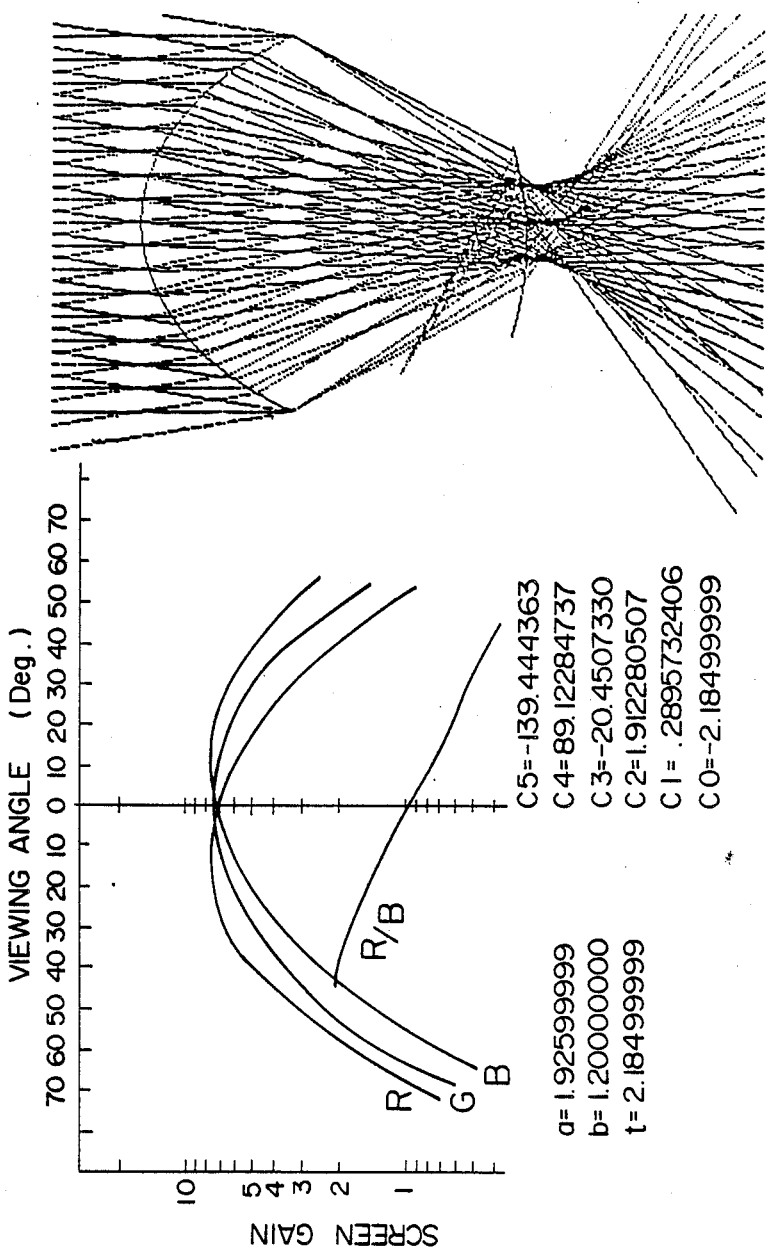
Figure 19:
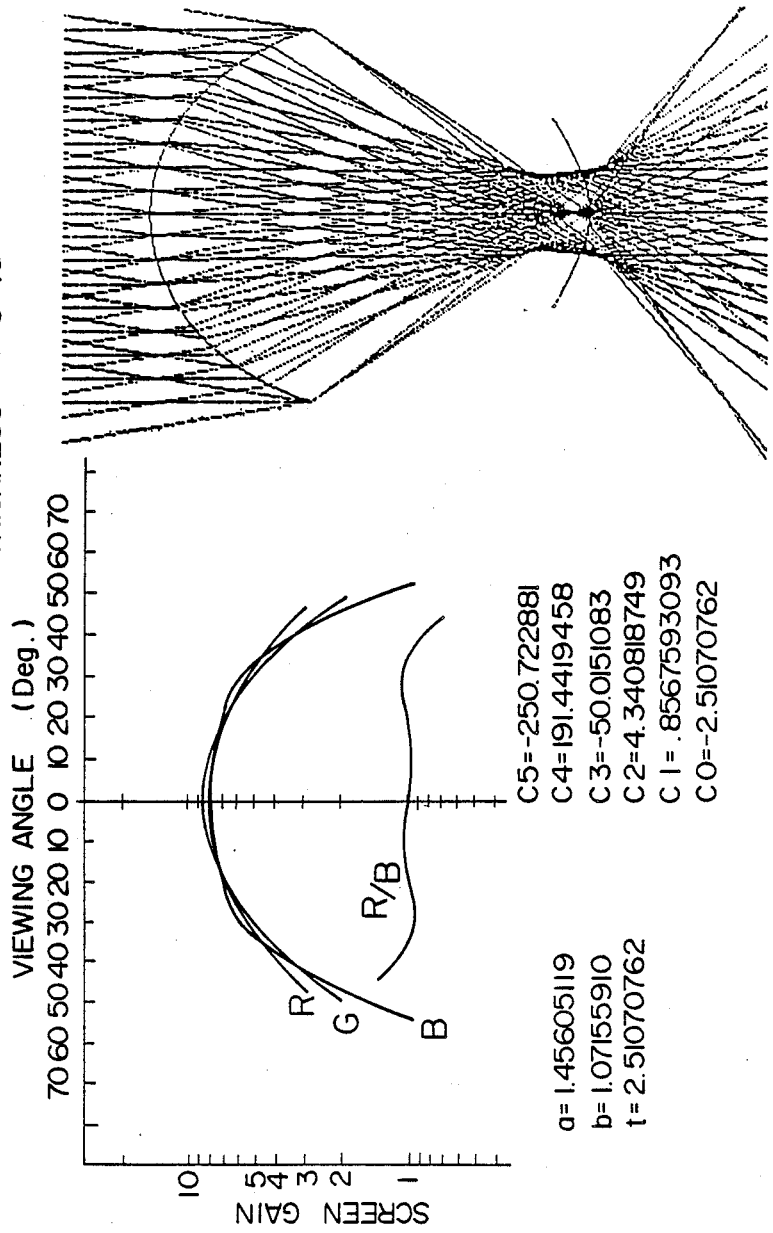
FIGS. 19 through 24 are views illustrating the results of calculation using the specific configuration of the conventional screen for comparison purpose.
Figure 20:
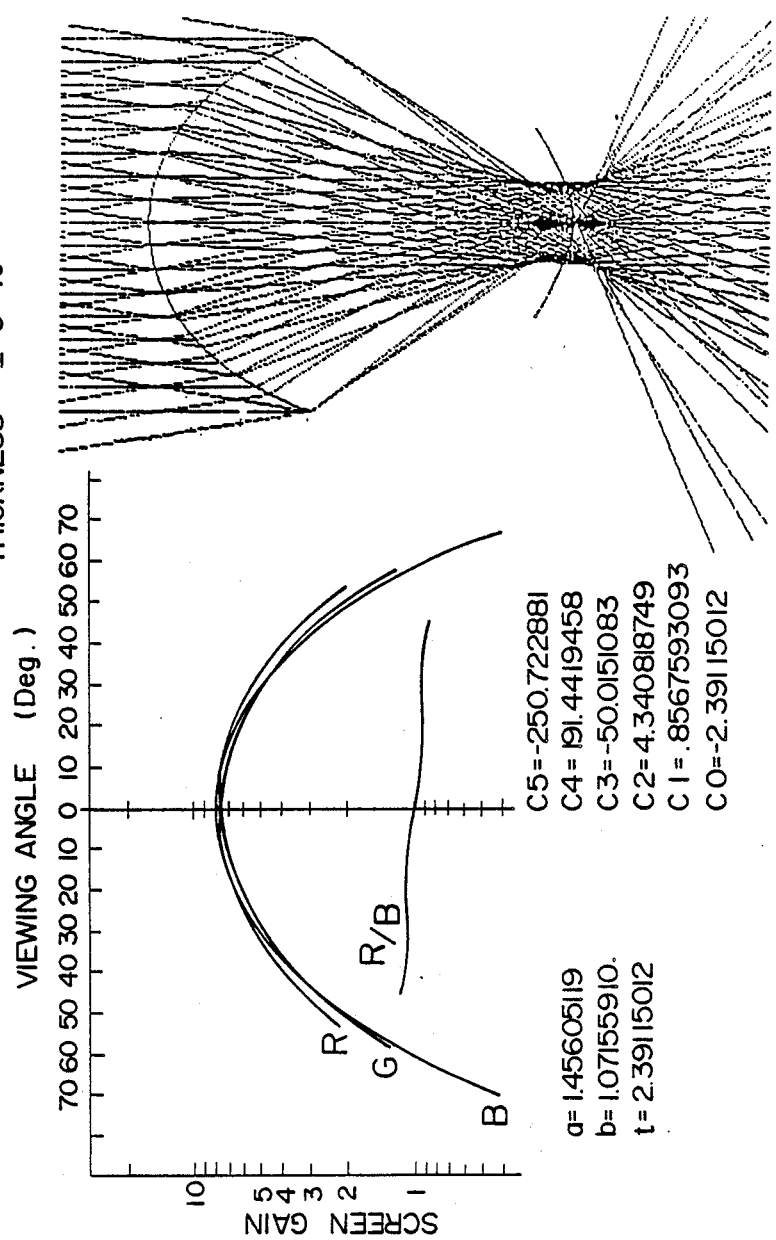
Figure 21:
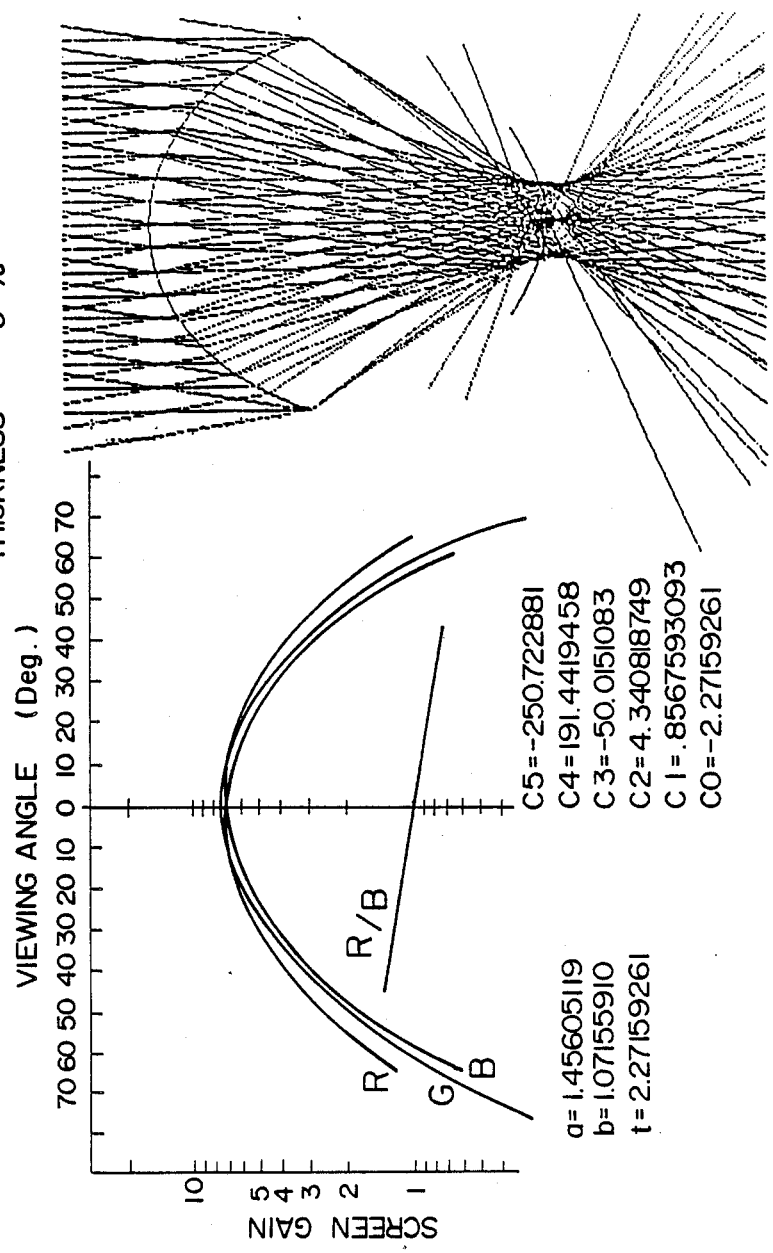
Figure 22:
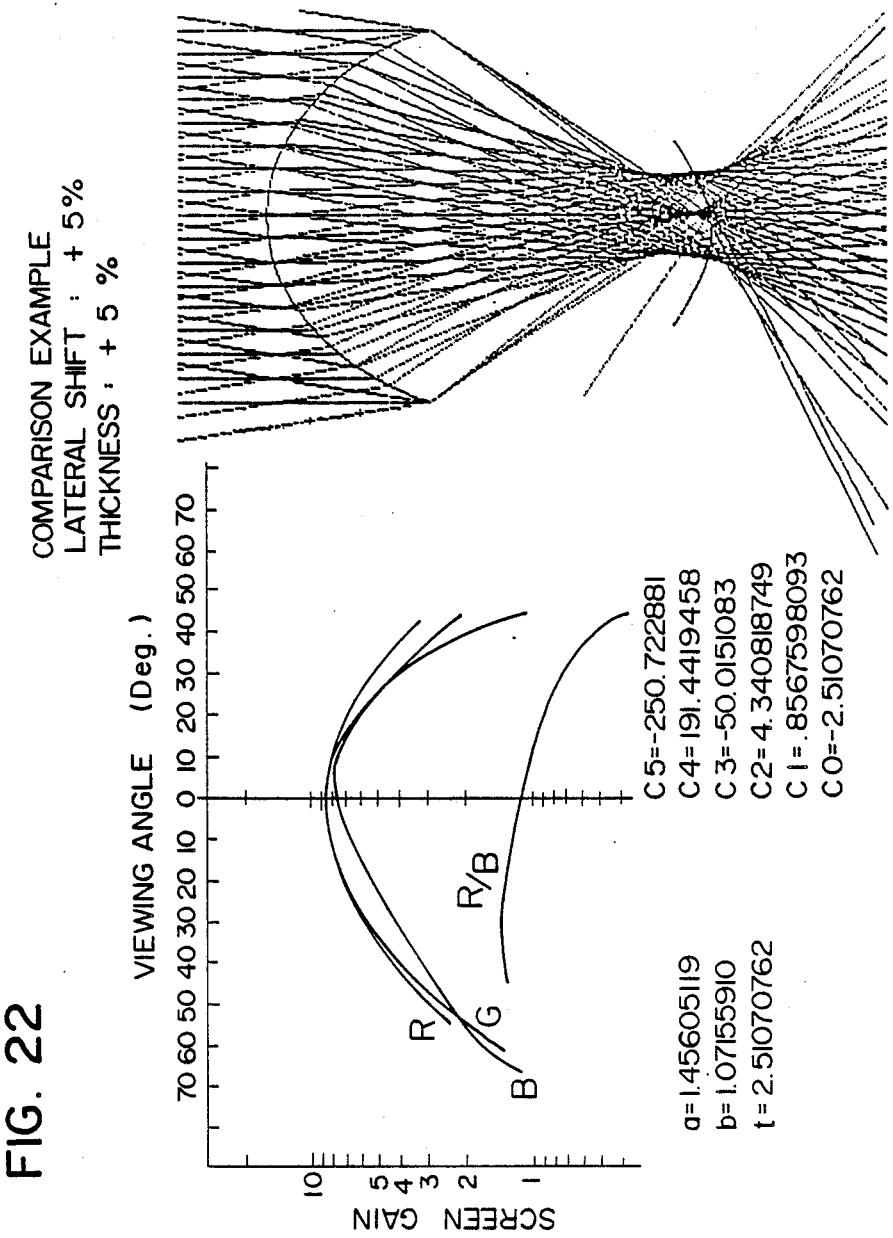
Figure 23:
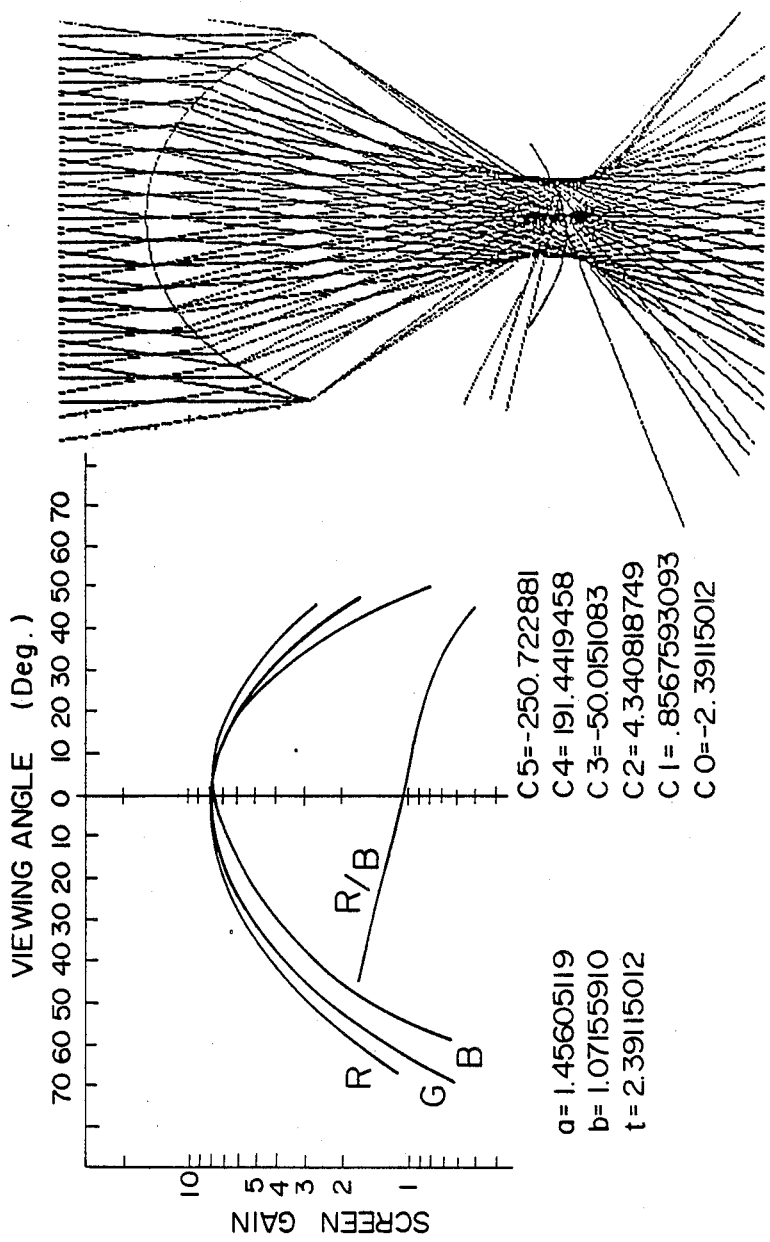
Figure 24:
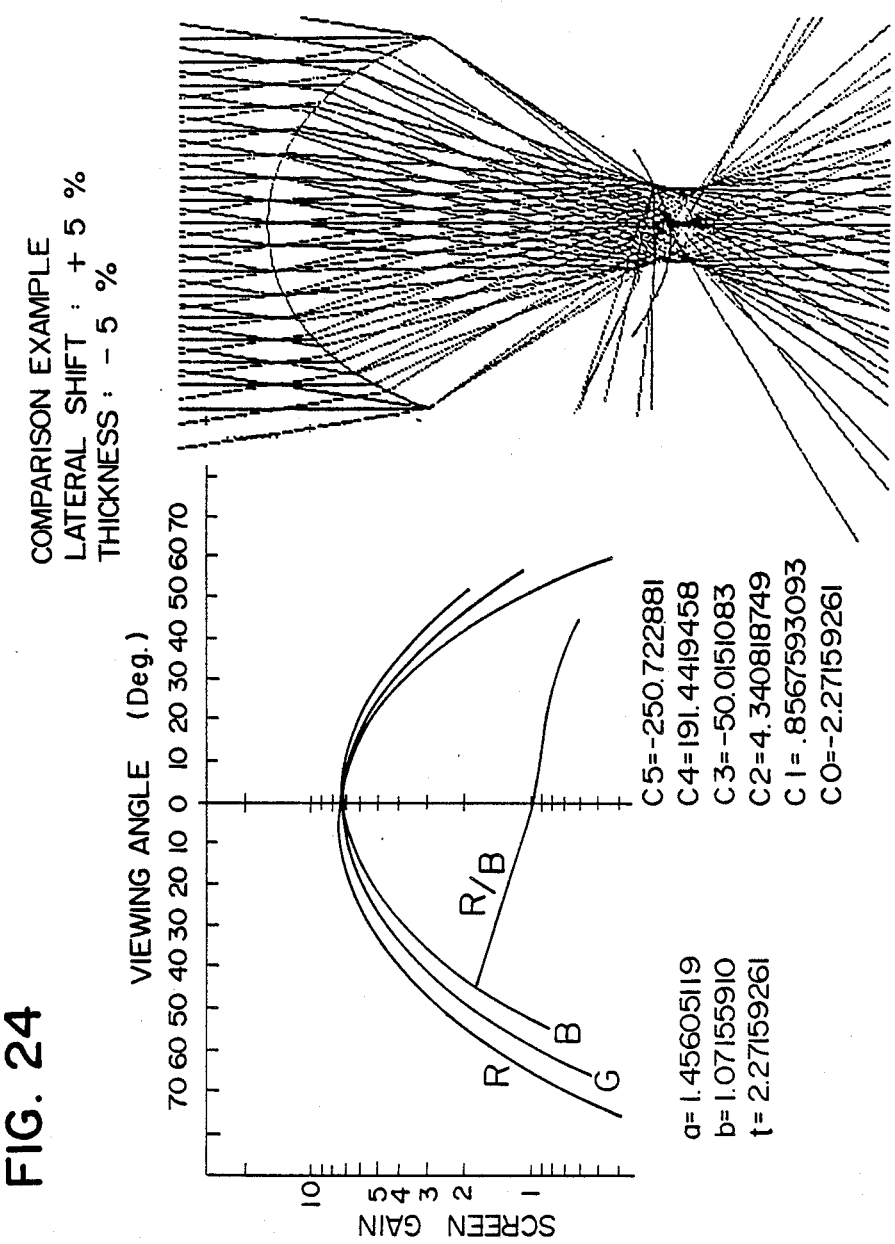

Further, another rear projection having a configuration shown in FIG. 12 was also designed as a comparison example. This configuration will be explained below:

The surface of the incident lens is a part of an ellipsis given by the general elliptic formula:

$$\frac{x^2}{b^2} + \frac{y^2}{a^2} = 1$$

The surface of the exit lens is determined by a polynomial expression:

$$y = c_0 + c_1 x^2 + c_2 x^4 + c_3 x^6 + c_4 x^8 + c_5 x^{10}$$

The thus designed rear projection screens were examined under simulation test in the case of having no lateral shift and 5% of the pitches P of a lateral shift. Further, it was also considered such a case that the thickness (t) of the screen which corresponds to the maximum distance between the surface of the entrance lens and the surface of the exit lens is selected to be equal to a designed value, and less and greater than the latter by 5% of the pitches P. The results of the simulation test are shown in FIGS. 13 through 24 among which FIGS. 13 through 18 show the results from the reference example according to the present invention, and FIGS. 18 through 24 show the results from the comparison example.

In these figures, the scales taken on the x-axis and y-axis are normalized, each corresponding to one-half of the value of the pitches P. Further, in these figures, the curves R/B show the variation of the gain ratio of red light and blue light vs. the viewing angle. The gain ratio R/B becomes ideal if it is held at a value of one. Three adjacent curves in these figures show the screen gains of red light, green light and blue light, resectively, which correspond to the ratio of the luminance and the illuminance.

It is noted that the results from the reference example give no substantial variations while the results from the comparison example are not uniform. That is, the comparison example raises the following problem:

(1) The viewing angle range is greatly changed when the thickness of the screen varies although no lateral shift is there. That is, should thereby irregular thicknesses locally in the entire screen, bright parts (thin thickness parts) and dark parts (thick thickness parts) are visible when the exit surface of the screen is observed in the inclined direction, causing oil stain-like shading of intense contrast. Further, color balance between red and blue colors varies greatly.

(2) If a lateral shift is present, the curve of gain vs. viewing angle become excessively asymmetric, resulting in a very narrow viewing angle range in one direction.

Lenticular type rear projection screens respectively having the configurations of the reference example and the comparison example were produced by way of experiment, having dimensions of 970 mm × 740 mm for 45-in.size projection TV.

Figure 25:
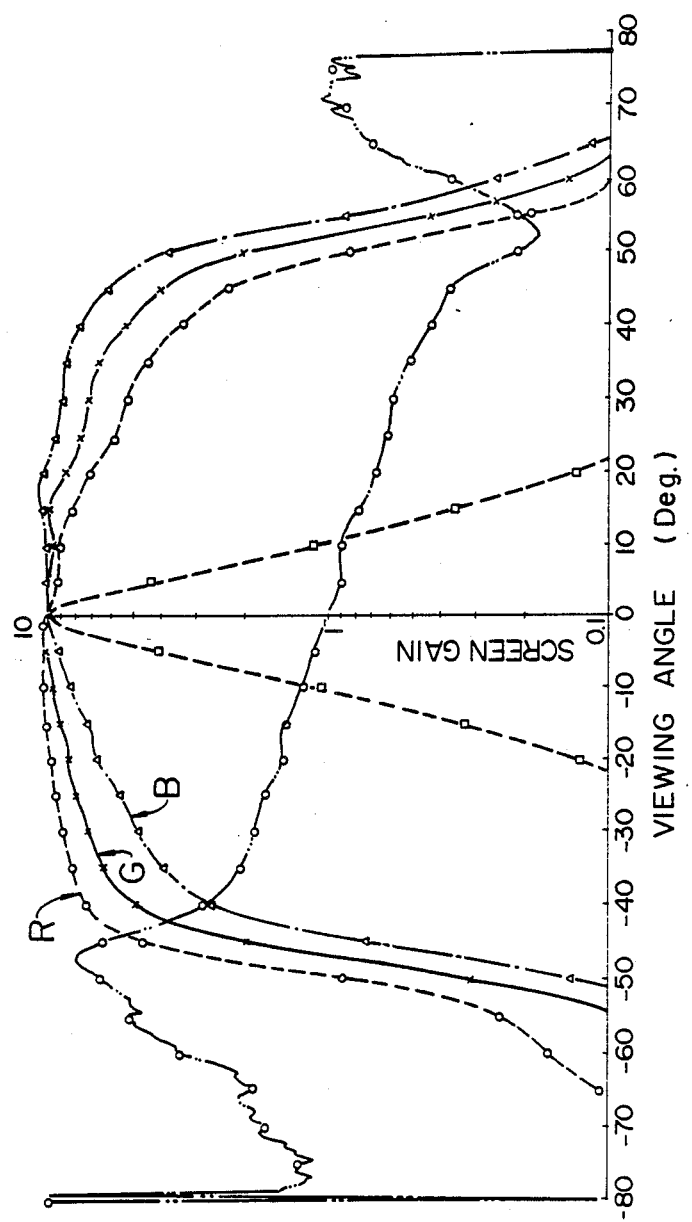
Figure 26:
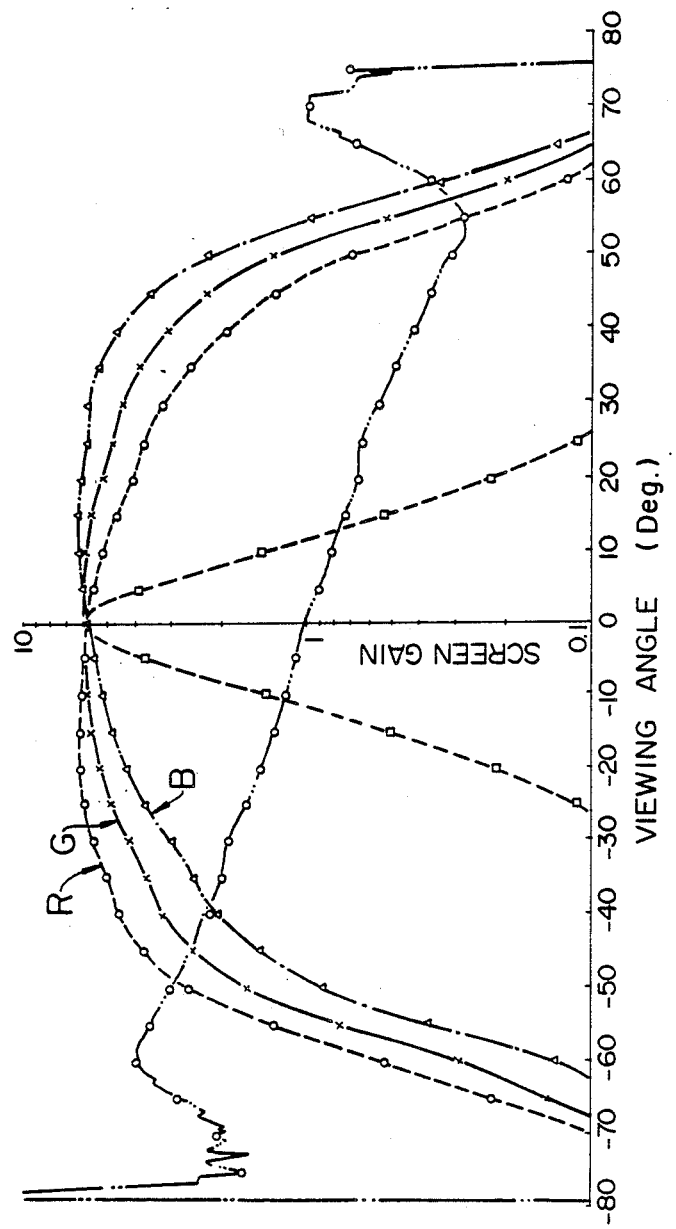

Test pieces of 5 cm. Sq. were obtained from these rear projection screens, respectively, for measuring the curves of gain vs. viewing angle which are shown in FIGS. 25 to FIG. 28. More specifically, FIGS. 25 and 26 show the results from the test pieces have the configuration of the reference example according to the present invention, and FIG. 25 concerns the screen having a thickness greater than the designed value by 20 μm and a lateral shift of 40 μm, while FIG. 26 concerns the screen having a thickness greater than the designed value by 5 μm and a lateral shift of 6 μm. Further, FIGS. 27 and 28 show the results from the test pieces having the configuration of the comparison example, and FIG. 27 concerns the screen having a thickness greater than the designed value by 18 μm and a lateral shift of 31 μm while FIG. 28 concerns the screen having a thickness greater than the designed value by 5 μm and a lateral shift of 7 μm.

It shows that these test results of the actual measurements are well coincident with those of the simulation tests.

It is noted that the test pieces according to the present invention give relatively stable results while the test pieces of the comparison example raise the following problems.

(1) irregular thicknesses cause intense shading (irregularity in luminance); and (2) a lateral shift causes a narrow viewing angle range in one direction.

The above-mentioned facts were confirmed with the use of an actual rear projection screen used in a 45-in. size projection type TV.

These facts give a tendency similar to that obtained by the above-mentioned simulation test.

Thus, it is considered that the rear projection screen has great tolerance for irregularity in the thickness of the screen and lateral shifts in comparison view the conventional rear projection screen.

What is claimed is:

1. A rear projection screen comprising a screen member having an entrance surface for receiving red, blue and green rays from projectors on a projection side and formed therein with entrance lenses, said entrance lenses being arranged at predetermined pitches, and an exit surface allowing images synthesized with the red, blue and green light rays to be observed on a viewing side and formed therein with exit lenses corresponding respectively to said entrance lenses, said exit lenses being arranged at predetermined pitches, each of said entrance lenses having a first optical axis and a lens surface in the vicinity of said first optical axis, and each of said exit lenses having a second optical axis and an outward convex surface with an optical curvature so that each entrance lens transmits red, blue and green light rays toward the corresponding exit lens while said entrance lens converge the light rays into a focused beam in the vicinity of a cross point between said outward convex lens surface and the second optical axis, and so that each of said exit lenses diverges the light rays from said focused beam and emits said light rays toward the viewing side over a predetermined viewing angle, wherein each of said outward convex lens surfaces has a flat center part having a width of 1% to 10% of said predetermined pitches of said entrance lenses, and a part outside of said center part having said optical curvature, whereby those of the light rays from said focused beam which are incident upon said part outside of said center part have incident angles smaller than a total reflection angle thereof.

2. A rear projection screen according to claim 1 wherein each of said exit lenses further has an outermost side part which is tangential to said part outside of said center part.

3. A rear projection screen comprising a screen member having an entrance surface for receiving red, blue and green rays from projectors on a projecting side and formed therein with entrance lenses, and an exit surface allowing images synthesized with the red, blue and green light rays to be observed on a viewing side and formed therein with exit lenses corresponding respectively to said entrance lenses, each of said entrance lenses having a first optical axis and a lens surface in the vicinity of said first optical axis, and each of said exit lenses having a first optical axis and an outward convex surface with an optical curvature so that each entrance lens transmits red, blue and green light rays toward the corresponding exit lenses while said entrance lens converges the light rays into a focused beam in the vicinity of a cross point between said outward convex lens surface and the second optical axis, and each of said exit lenses diverges the light rays from said focused beam and emits said light rays toward the viewing side over a predetermined viewing angle, wherein said outward convex surfaces have a center part having said optical curvature in the vicinity of said second optical axis and a part outside of said center part with less curvature than said optical curvature to allow the light rays from said focused beam which are incident thereupon to have incident angles smaller than a total reflection angle thereof.

* * * * *